United States Patent [19]

Ino

[11] Patent Number: 5,387,987
[45] Date of Patent: Feb. 7, 1995

[54] METHOD AND APPARATUS FOR REPRODUCING HALF-TONE IMAGES

[75] Inventor: Naosuke Ino, Kanagawa, Japan

[73] Assignee: Fuji Xerox Co., Ltd., Tokyo, Japan

[21] Appl. No.: 950,692

[22] Filed: Sep. 25, 1992

[30] Foreign Application Priority Data

Sep. 26, 1991 [JP] Japan .................. 3-273497

[51] Int. Cl.$^6$ .............................................. H04N 1/40
[52] U.S. Cl. ..................................... 358/456; 358/465; 358/466
[58] Field of Search ................ 358/456, 447, 466, 462, 358/455, 443, 465, 298, 166, 80, 167, 75

[56] References Cited

U.S. PATENT DOCUMENTS

| | | | |
|---|---|---|---|
| 5,045,952 | 9/1991 | Eschbach | 358/447 |
| 5,051,844 | 9/1991 | Sullivan | 358/456 |
| 5,060,284 | 10/1991 | Klees | 358/465 |
| 5,068,914 | 11/1991 | Klees | 358/166 |
| 5,070,413 | 12/1991 | Sullivan et al. | 358/456 |
| 5,107,332 | 4/1992 | Chan | 358/80 |
| 5,130,819 | 7/1992 | Ohta | 358/445 |
| 5,130,823 | 7/1992 | Bowers | 358/465 |
| 5,140,432 | 8/1992 | Chan | 358/298 |
| 5,243,445 | 9/1993 | Koike | 358/462 |
| 5,245,678 | 9/1993 | Eschbach et al. | 382/50 |
| 5,268,774 | 12/1993 | Eschbach | 358/466 |
| 5,278,671 | 1/1994 | Takahashi et al. | 358/456 |

FOREIGN PATENT DOCUMENTS

| | | |
|---|---|---|
| 1-158877 | 6/1989 | Japan . |
| 1-228372 | 9/1989 | Japan . |

OTHER PUBLICATIONS

"4.3: An Adaptive Algorithm for Spatial Grey Scale," Robert Floyd et al., SID Symp., Digest of Papers, p. 36 (1975).

Primary Examiner—Paul Ip
Attorney, Agent, or Firm—Finnegan, Henderson, Farabow, Garrett & Dunner

[57] ABSTRACT

A method and apparatus for reproducing half-tone images by converting continuous-tone image data into a multi-valued level density code using a predetermined threshold or thresholds includes adding an output adjusting error to a difference error between image data of a target pixel and a threshold level and diffusing the difference error to which the output adjusting error has been added into pixels surrounding the target pixel.

10 Claims, 4 Drawing Sheets

METHOD AND APPARATUS FOR REPRODUCING HALF-TONE IMAGES

BACKGROUND OF THE INVENTION

1. Field of the Invention

The invention relates to methods and apparatuses for reproducing half-tone images for image data having tone components. More particularly, the invention is directed to an improvement of a method and apparatus for reproducing half-tone images by converting continuous-tone image data into a multi-valued level density code using a predetermined threshold or thresholds.

2. Description of the Related Art

Known as a conventional method of reproducing half-tone images is an error diffusing method by Floyd, in which a predetermined algorithm is used in, e.g., binary-coding continuous-tone image data of a target pixel (R. Floyd & L. Steinberg: "An Adaptive Algorithm for Spatial Grayscale," SID Symp., Digest of Papers, p. 36 (1975)). According to the above method, the influence of a difference error between the image data and the threshold is diffused into surrounding pixels to thereby improve the reproducibility of half-tone images by binary-coding (See Published Unexamined Japanese Patent Application Nos. 228372/1989 and 158877/1989).

By the way, when a user operates a full-color image output apparatus adopting such a half-tone image reproducing method to produce a hard copy, which is a final output, the produced color tone is often different from what has been expected due to the operating environment and secular changes.

For this reason, what has been called for is a function in which the user can adjust the color tone as desired by a simple operation. Conventional color tone adjusting methods include a method of changing the masking constant when the RGB color representing system is converted to the YMC color representing system, and a method of adjusting the density of each color by changing the developing bias voltage in the case of electrophotography, or by changing energy to be applied in the case of ink jet recording systems or thermal recording systems.

However, in the method of changing the masking constant out of the conventional color tone adjusting technology, a number of masking constants, as many as 9 (at least), must usually be changed. When performing the masking operation by using a look-up table or the like, complicated operations including the operation of rewriting enormous amounts of table contents are entailed.

Also, color image output apparatuses adopting the electrophotographic system, the ink jet recording system, the thermal recording system, or the like have encountered the problem that there is a limitation in fine-tuning the density at the output hardware, which problem has not yet been solved.

These technical problems are similarly encountered not only by half-tone full-color image output apparatuses but also by half-tone single-color image output apparatuses.

SUMMARY OF THE INVENTION

The invention has been made to overcome the above technical problems. Accordingly, an object of the invention is to provide a half-tone image reproducing method and apparatus capable of achieving output level adjustment easily and accurately.

More specifically, a half-tone image reproducing method of the invention, as shown in FIG. 1, involves the steps of: adding an output adjusting error OER to a difference error ER between the image data DT of a target pixel and a threshold level; and diffusing the difference error ER to which the output adjusting error OER has been added into pixels surrounding the target pixel, when continuous-tone image data DT of each pixel is converted into a multi-valued level density code CD of every predetermined threshold segment or every plurality of predetermined threshold segments.

As shown in FIG. 1, an apparatus embodying such method of the invention includes: a density code generating means 1 that converts the continuous-tone image data DT of each pixel into a multi-valued level density code of every predetermined threshold segment or every plurality of predetermined threshold segments; an output adjusting means 2 that variably sets an output adjusting error OER; and an error diffusion processing means 3 that adds the output adjusting error OER to a difference error ER between the image data DT of a target pixel and a threshold level, diffuses the difference error ER to which the output adjusting error OER has been added into pixels surrounding the target pixel, and then adds the diffused difference error ER to the continuous-tone image data DT to be sent to the density code generating means 1.

In such technical means, the invention is applied not only to apparatuses of reproducing half-tone full-color images, but also to apparatuses of half-tone single-color (including only black) images.

Also, as long as a code setting means that at least sets an image density code by color component while dividing density tone levels of continuous-tone input image data belonging to each color component by a predetermined threshold is provided as the density code generating means 1, the number, system, etc. of generating the image density code may be arranged as appropriate.

Further, the output adjusting means 2 may be designed so that the output can be adjusted appropriately by manual operation, or may instead be designed so that the color density of an output image is measured at an appropriate timing in the output adjusting mode or during image reproduction to thereby allow the output to be adjusted automatically based on such measurement.

Still further, the system of diffusing an error into surrounding pixels effected by the error diffusion processing means 3 may appropriately be selected. For example, a difference error ER (to which an output adjusting error OER has been added) of a predetermined pixel located around a target pixel may be added to current data of the target pixel by multiplying the difference error ER by a predetermined weight.

According to the technical means such as described above, the density code generating means 1 can convert continuous-tone image data DT of each pixel into a multi-valued level density code CD of every predetermined threshold segment or every plurality of predetermined threshold segments.

At this point, the output adjusting means 2 sets an output adjusting error OER variably, whereas the error diffusion processing means 3 adds the output adjusting error OER to a difference error ER between the image data DT of a target pixel and a threshold level, and then diffuses the difference error ER to which the output adjusting error OER has been added into pixels surrounding the target pixel.

In such half-tone image reproducing method, the difference error ER (to which the output adjusting error OER has been added) is calculated by a difference between the inputted continuous-tone image data and the image data based on the density code CD that has actually been outputted (the difference being a difference between an input, i.e., the data expected to be expressed by this pixel and an output, i.e., the data actually expressed by this pixel).

Here, e.g., the density of the output image being too high means that the output data actually expressed by this pixel is higher than expected. It is therefore understood from this that a correct output can be produced by adjusting the output level of image data based on the density code at the time of calculating the error, i.e., two levels, high and low, of, e.g., binary-coded image data.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the accompanying drawings.

DESCRIPTION OF THE PREFERRED EMBODIMENT

An embodiment of the invention will be described in detail with reference to the accompanying drawings.

Figure 1:
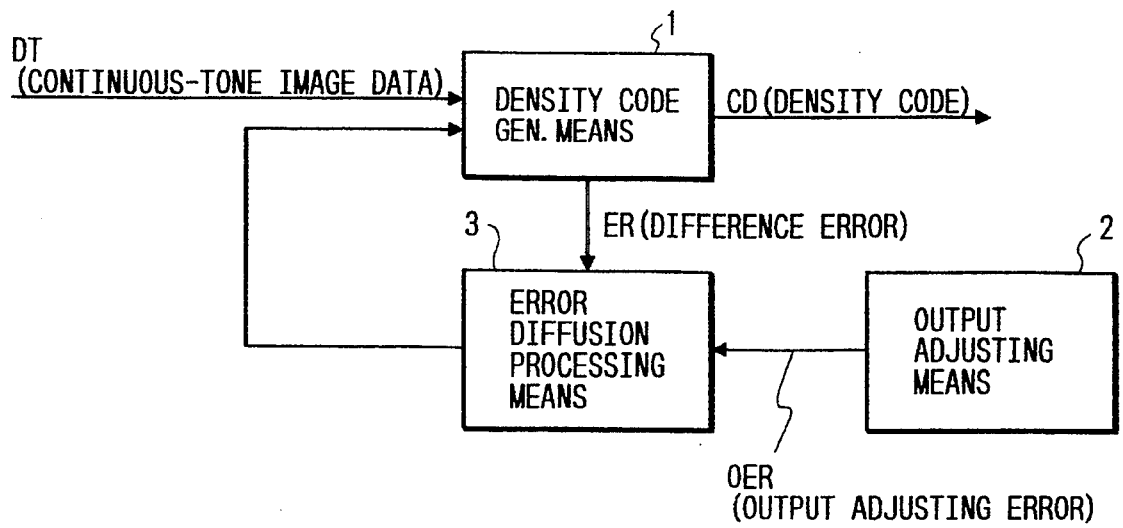
FIG. 1 is a diagram outlining a method and apparatus for reproducing half-tone images of the invention.
Figure 2:
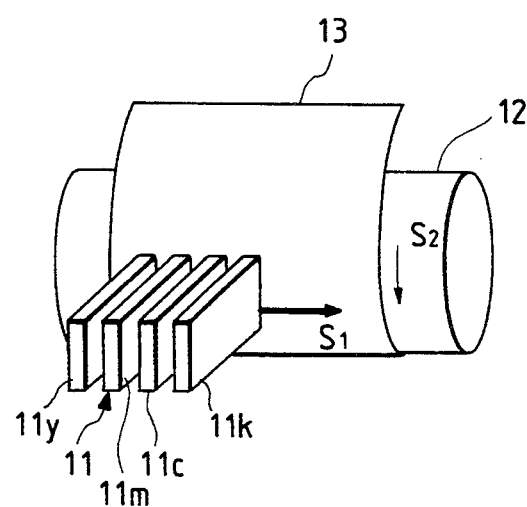
FIG. 2 is a diagram illustrative of a color ink jet recording apparatus used in an embodiment of the invention.

FIG. 2 is a diagram schematically showing a configuration of a color ink jet recording apparatus used in this embodiment.

This is a so-called drop on-demand type color ink jet recording apparatus. Print heads 11 (specifically, 11y, 11m, 11c, 11k) for four colors, yellow, magenta, cyan, and black, are arranged in parallel with each other and so as to be movable in a main scanning direction S1 by a not shown carriage. After a single round of main scanning by the carriage has been completed, a recording sheet 13 is moved in an auxiliary scanning direction S2 by a sheet forward roll 12, and a next round of scanning is then effected by the carriage. Each print head 11 makes such an on/off control as applying or not applying a drop without making a so-called "dot diameter modulation" in which the amount of ink dropped is modulated, so that dots are printed on the recording sheet 13 while overlapping the four colors in accordance with an input image signal.

Figure 3:
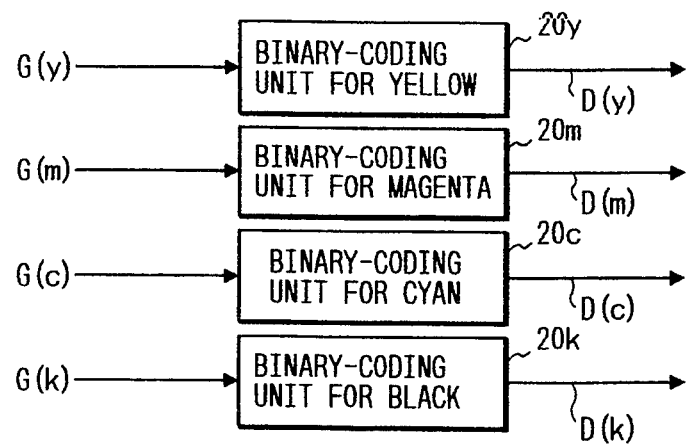
FIG. 3 is a diagram illustrative of a general configuration of a color image binary-coding apparatus used in the embodiment of the invention.

FIG. 3 shows a specific example of an apparatus for binary-coding a color image to be used in the color ink jet recording apparatus that is the embodiment of the invention.

In FIG. 3, reference numeral 20 (specifically, 20y, 20m, 20c, 20k) designates binary-coding units for yellow, magenta, cyan, and black. The units 20 binary-code image inputs of colors G (y), G (m), G (c), and G (k), and produce binary-coded data D (y), D (m), D (c), and D (k), respectively.

Figure 4:
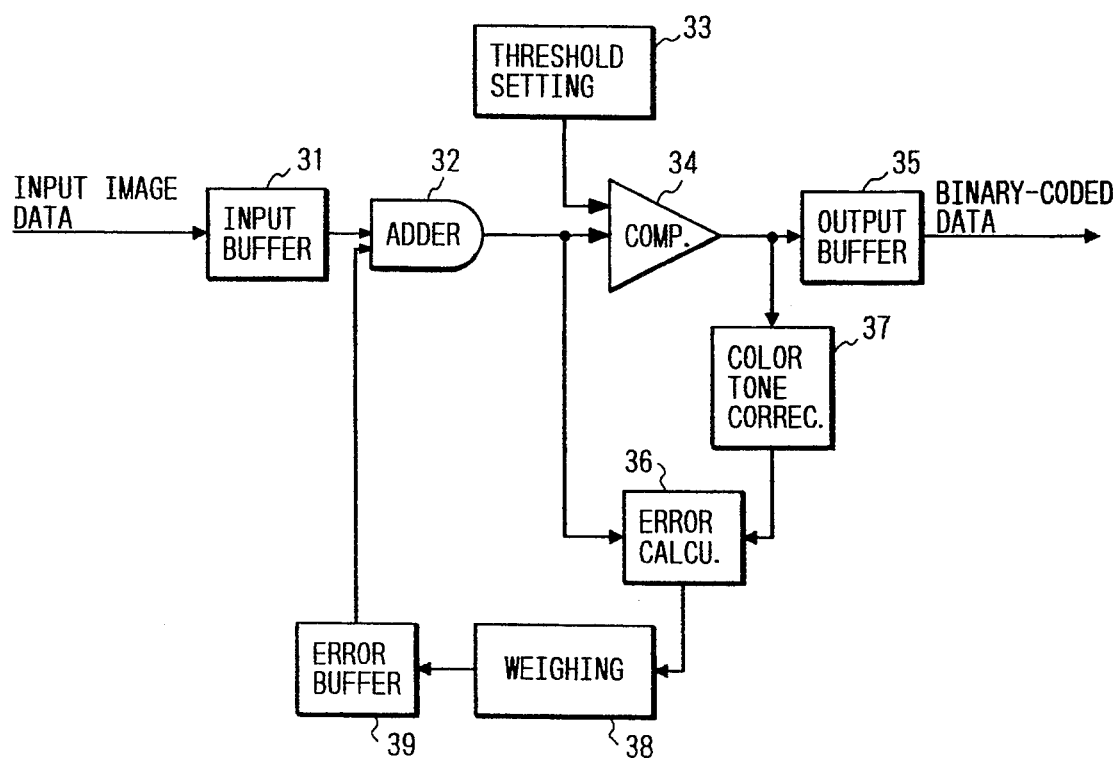
FIG. 4 is a block diagram showing a specific configuration of a binary-coding unit shown in FIG. 3.

FIG. 4 shows a specific configuration of each binary-coding unit 20 used in this embodiment.

In FIG. 4, reference numeral 31 designates an input buffer that temporarily stores input data (data equivalent to the inking area ratio of a target pixel, which is image data of 256 tone in this embodiment); 32, an adder that adds the input image data from the input buffer 31 to difference data (described later); 33, a threshold setting circuit that sets a threshold involved in binary-coding, which is 127 in this embodiment; 34, a comparator that binary-codes while comparing the output from the adder 32 with the threshold set by the threshold setting circuit 33; 35, an output buffer that temporarily stores the binary-coded data from the comparator 34; 36, an error calculating circuit that calculates an error component generated when data is binary-coded by the comparator 34; 37, a color tone correcting circuit that makes an output adjustment for the error component generated when data is binary-coded by the comparator 34; 38, a weighing circuit that calculates error data for multiplying the error component outputted from the error calculating circuit 37 by a predetermined weighing constant (equivalent to the degree of diffusion to the surrounding pixels) to thereby diffuse the error into the surrounding pixels; and 39, an error buffer that temporarily stores the error data from the weighing circuit 38.

Figure 5:
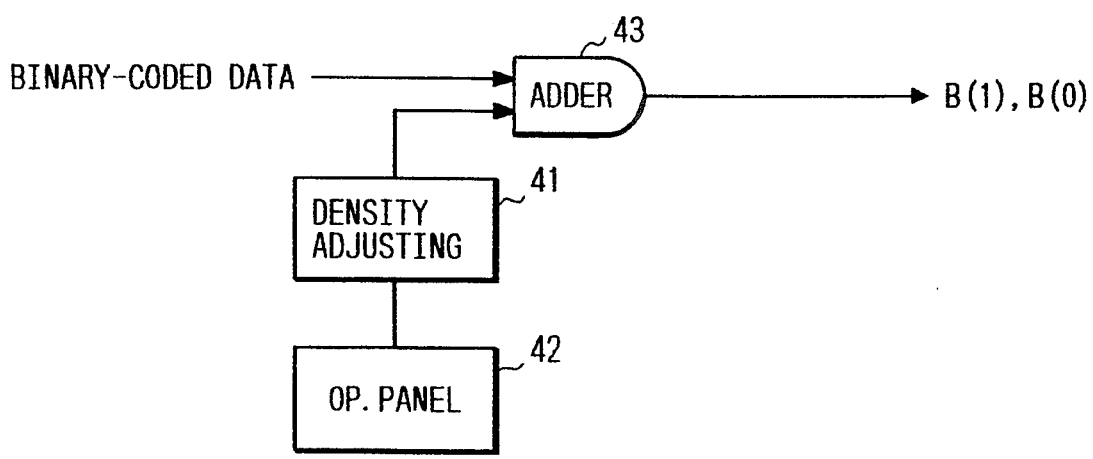
FIG. 5 is a block diagram showing a specific configuration of a color tone correcting circuit shown in FIG. 4.

An exemplary configuration of the color tone correcting circuit 37 for this embodiment is shown in FIG. 5. In FIG. 5, reference numeral 41 designates a density correcting circuit that variably sets a density adjusting constant A ($\alpha < A < \alpha$: $\alpha = 0.25$ typical value) within a predetermined range in response to manual operation from an operation panel 42; and 43, an add operation circuit for adding output binary-coded data ("1" or "0") from the comparator 34 to the density adjusting constant A and outputting B (1) (an actual image output for the output binary-coded data (1)) and B (0) (an actual image output for the output binary-coded data "0") through calculation based on equations (1) or (2). Since the image data to be inputted is of a narrow range instead of the full range from 0 to 255, adjustment of both directions can be made by setting a default.

Figure 7:
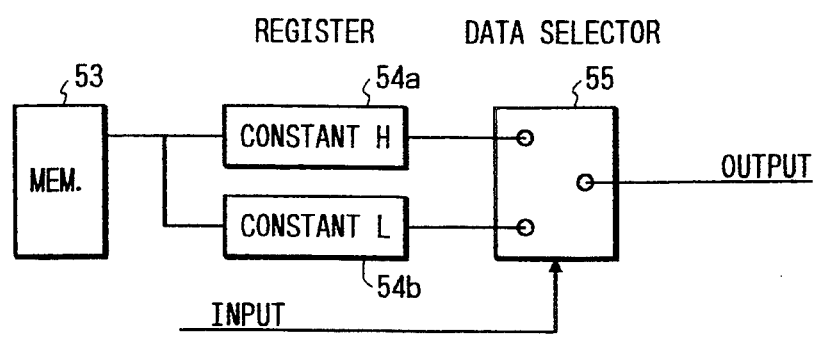
FIG. 7 is a block diagram showing another exemplary color tone correcting circuit.

Another embodiment of a color tone correcting circuit is shown in FIG. 7. The color tone correcting circuit has a memory 53 for storing image output values B (1) and B (0) corresponding to a density constant A. Upon determination of the density constant A, the constants B (1) and B (0) are registered in registers 54a and 54b, respectively. And when the two values from the comparator 34 have been inputted in a data selector 55, one of the registers 54a, 54b is selected and the value in the selected register is outputted to the error calculating circuit 36.

$$B(1) = (1+A) \times 255 \qquad (1)$$

$$B(0) = A \times 255 \qquad (2)$$

An operation of the color ink jet recording apparatus of this embodiment will be described next.

In each binary-coded unit 20, input image data are temporarily stored in the input buffer 31 and read on a single pixel basis. Thereafter, error data of an already processed pixel is added to the input image data by the adder 32, and the sum is applied to the comparator 34. The comparator 34 compares the input data with a threshold and binary-codes the input data into "1" or "0" in accordance with the comparison result. The output of the comparator 34 is stored in the output buffer 35.

The binary-coded data outputted from the comparator 34 is sent to the color tone correcting circuit 37. The color tone correcting circuit 37 executes the operation based on equations (1) or (2) in accordance with the density correcting constant A set by manually operating the operation panel 41 so that a predetermined color tone correcting process is performed for output binary-coded data.

That is, if a color density of the output image is low, the density correcting constant A is set to an appropriate negative value. In this case, the output image data B (1) for the output binary-coded data "1" is set to a value smaller than "255," e.g., "245," whereas the output image data B (0) for the output binary-coded data "0" is set to a value smaller than "0," e.g., "−10."

And the output from the color tone correcting circuit 37 is fed to the error calculating circuit 36 so as to be subjected to predetermined error calculation.

In this embodiment it is assumed that (Difference error)=(Input image data) - (Output binary-coded image data). Here, the following output binary-coded image data are used: ON=(1+A)×255, OFF=A×255 (if A=0, then the data is 0).

Therefore, in this error calculating circuit 36, a correct error component can be calculated from the output data corresponding to the actual color density. Thus, error diffusion processing corresponding to the diameter of an actual print dot can be performed.

The error component thus calculated is stored in the error buffer 39 while multiplied by a predetermined weight at the weighing circuit 38. The error data stored in the error buffer 39 is stored as a cumulative total for unprocessed pixels and added to the corresponding input image data at the adder 32.

The color image thus processed is compared with a color image obtained by a comparative example to which no color tone correction has been made. It has been verified that the color image of the comparative example exhibited some loss of color tone whereas the color image of the embodiment exhibits extremely satisfactory color tone.

While the color tone correcting circuit 37 of this embodiment is designed to vary both high and low levels of the output binary-coded data, the application of the invention is not necessarily limited thereto. It may be only one level, high or low, that is variable.

Figure 6:
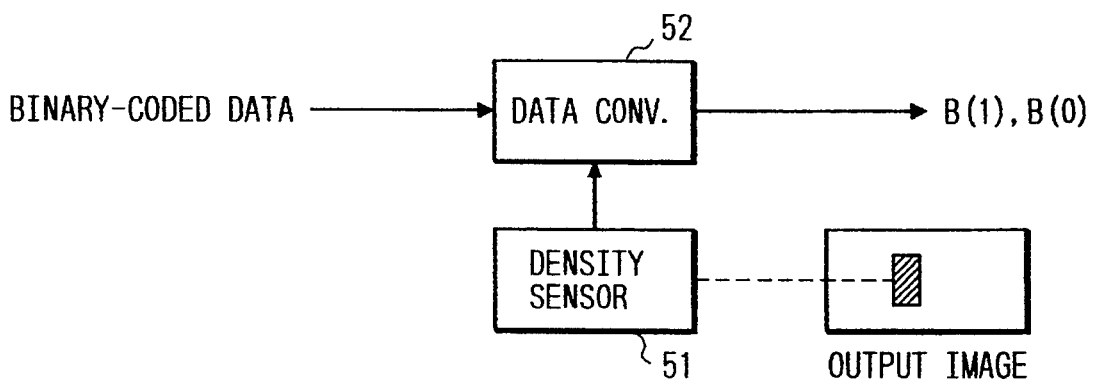
FIG. 6 is a diagram illustrative of a modified example of the color tone correcting circuit.

While color tone is manually adjusted by the color tone correcting circuit 37 of this embodiment, the application of the invention is not limited thereto. For example, as shown in FIG. 6, the color tone correcting circuit 37 may be arranged in such a manner that the color density of an output image is measured at a density sensor 51 at an appropriate timing in the output adjustment mode or during the image reproducing process and that the binary-coded data is automatically adjusted to an output level that is based on the actually measured density data by a data converting circuit 52.

Figure 8:
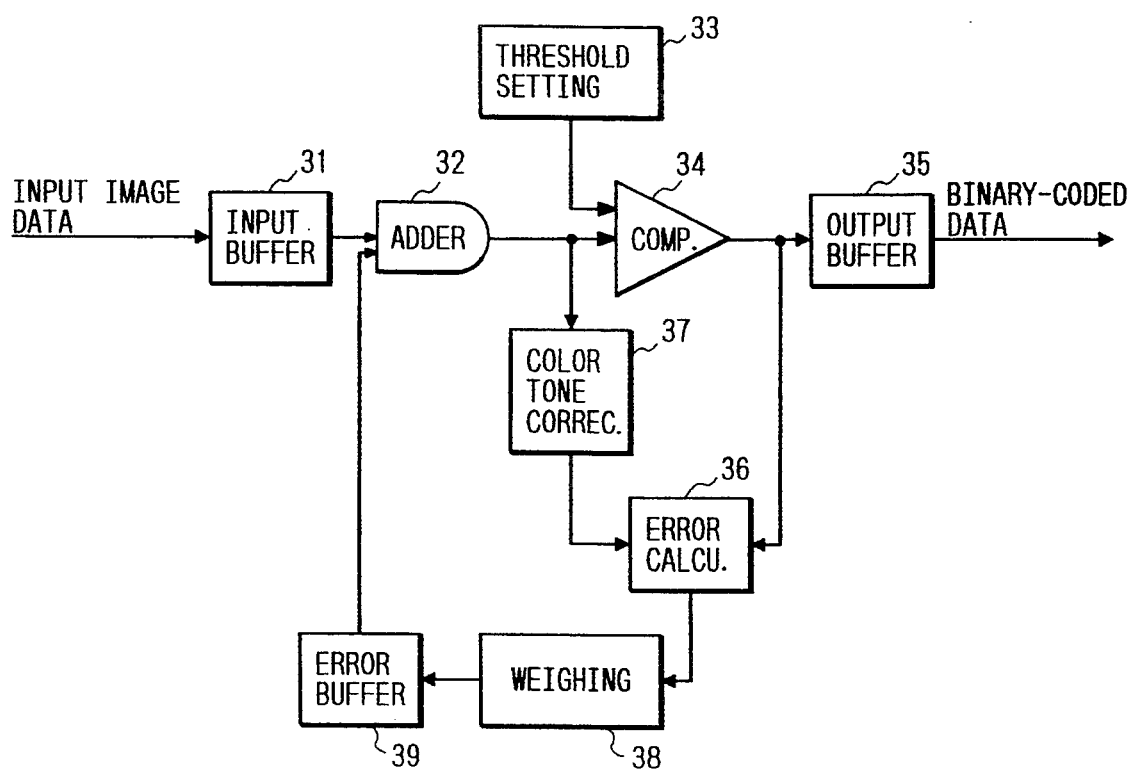
FIG. 8 is a block diagram showing another exemplary binary-coding unit.

Also, as shown in FIG. 8, the color tone correcting circuit 37 may be so designed that the output of an adder 32 is corrected and that the corrected output is applied to an error calculating circuit 36.

As described in the foregoing pages, the first or second aspect of the invention is directed to a system of reproducing continuous-tone images in which continuous-tone image data is converted into a multi-valued code of a plurality of levels and a difference error associated with the multi-valued coding is then diffused into surrounding pixels. In such system, an output adjusting error is taken into consideration in the difference error when the error diffusion processing is performed. As a result, output level adjustment can be introduced into the existing error diffusing processing easily, which in turn allows output level adjustment to be accomplished simply and accurately without complicating the apparatus unnecessarily.

What is claimed is:

1. A method of reproducing half-tone images comprising the steps of: adding an output adjusting error to a difference error between image data of a target pixel and a threshold level; and diffusing said difference error to which said output adjusting error has been added into pixels surrounding said target pixel when continuous-tone image data of each of said pixels is converted into one of multi-valued density codes, said density codes corresponding to classes defined by at least one predetermined threshold level.

2. The method of claim 1 wherein the half-tone image is either a half-tone full-color image or half-tone single-color image.

3. An apparatus for reproducing half-tone images comprising: density code generating means for converting multi-valued image data of each of plural pixels into one of multi-valued density codes, said density codes corresponding to classes defined by at least one predetermined threshold level; output adjusting means for variably setting an output adjusting error; error diffusion processing means for adding said output adjusting error to a difference error between image data of a target pixel and a threshold level, diffusing said difference error to which said output adjusting error has been added into pixels surrounding said target pixel, and adding said diffused difference error to said multi-valued image data to be sent to said density code generating means.

4. The apparatus of claim 3 wherein the half-tone image is either a half-tone full-color image or half-tone single-color image.

5. The apparatus of claim 3 wherein said density code generating means comprises code setting means for setting an image density code by color component while dividing density tone levels of continuous-tone input image data belonging to each color component by a predetermined threshold.

6. The apparatus of claim 3 wherein said output adjusting means includes means for manually setting the output adjusting error.

7. The apparatus of claim 3 wherein said output adjusting means adjusts an output based on color density of an output image which is measured at either an appropriate timing in an output adjusting mode or during image reproduction.

8. The apparatus of claim 3 wherein the means for diffusing an error into surrounding pixels effected by said error diffusion processing means adds a difference error of a predetermined pixel located around the target pixel to current data of the target pixel by multiplying the difference error by a predetermined weight.

9. An apparatus for reproducing half-tone images, comprising:
- means for converting tone image data for each of a plurality of pixels into binary-coded data;
- means for variably setting a density correction constant;
- means for generating a density correction value based on the density correction constant and the binary-coded data for a target pixel;
- means for generating a difference error based on tone image data of the target pixel and the density correction value;
- means for diffusing the difference error into pixels surrounding the target pixel; and
- means for adding the diffused difference error to the tone image data to be sent to the converting means.

10. The apparatus of claim 9, wherein the means for generating a density correction value calculates the density correction value based on the following equations:

$DV=(1+A)\times 255$, when the binary-coded data for a target pixel is equal to 1; and $DV=A\times 255$, when the binary-coded data for a target pixel is equal to 0; where A represents the density correction constant and DV represents the density correction value.

* * * * *